(12) United States Patent
Clark et al.

(10) Patent No.: US 12,101,218 B2
(45) Date of Patent: Sep. 24, 2024

(54) TRANSMIT SPECIFIC TRAFFIC ALONG BLOCKED LINK

(71) Applicant: Hewlett Packard Enterprise Development LP, Houston, TX (US)

(72) Inventors: Charles F. Clark, Roseville, CA (US); Shaun Wakumoto, Roseville, CA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 539 days.

(21) Appl. No.: 17/394,995

(22) Filed: Aug. 5, 2021

(65) Prior Publication Data

US 2021/0367853 A1 Nov. 25, 2021

Related U.S. Application Data

(63) Continuation of application No. 14/426,414, filed as application No. PCT/US2012/057569 on Sep. 27, 2012, now Pat. No. 11,102,077.

(51) Int. Cl.
| | | |
|---|---|---|
| *H04L 41/0213* | (2022.01) | |
| *H04L 12/44* | (2006.01) | |
| *H04L 41/12* | (2022.01) | |
| *H04L 45/00* | (2022.01) | |
| *H04L 45/48* | (2022.01) | |
| *H04L 49/354* | (2022.01) | |

(Continued)

(52) U.S. Cl.
CPC .......... *H04L 41/0213* (2013.01); *H04L 12/44* (2013.01); *H04L 41/12* (2013.01); *H04L 45/48* (2013.01); *H04L 45/66* (2013.01); *H04L 49/354* (2013.01); *H04L 41/0659* (2013.01); *H04L 45/18* (2013.01)

(58) Field of Classification Search
CPC ......... H04L 45/02; H04L 45/28; H04L 45/22; H04L 45/121; H04L 45/48; H04L 45/00; H04L 45/18; H04W 40/02; H04W 28/10
See application file for complete search history.

(56) References Cited

U.S. PATENT DOCUMENTS 7,948,922 B2  5/2011  Pang et al.
8,089,882 B2 * 1/2012  Guntur ................ H04L 12/4625
                                                      709/224

(Continued)

FOREIGN PATENT DOCUMENTS

CN    101252539 A    8/2008
CN    101330422 A    12/2008

(Continued)

OTHER PUBLICATIONS

"OpenFlow Switch Specification," Version 1.0.0 (Wire Protocol 0x01), Dec. 31, 2009, pp. 1-42.

(Continued)

*Primary Examiner* — Bob A Phunkulh
(74) *Attorney, Agent, or Firm* — Hewlett Packard Enterprise Patent Department

(57) ABSTRACT

Embodiments herein relate to transmitting specific traffic along a blocked link. A status of links between switches of a network is monitored. The status of the links is one of blocked and non-blocked. A blocked link is not used by a Spanning Tree Protocol (STP). At least one of the network switches is configured to transmit the specific traffic along the blocked link.

19 Claims, 3 Drawing Sheets

(51) Int. Cl.
   *H04L 41/0659*   (2022.01)
   *H04L 45/18*   (2022.01)

(56) References Cited

U.S. PATENT DOCUMENTS

| | | | |
|---|---|---|---|
| 8,111,715 B1* | 2/2012 | Pannell | H04L 12/4641 |
| | | | 370/476 |
| 9,038,151 B1 | 5/2015 | Chua et al. | |
| 2005/0063321 A1 | 3/2005 | Imai | |
| 2006/0206656 A1 | 9/2006 | Di et al. | |
| 2007/0242602 A1 | 10/2007 | Pang et al. | |
| 2008/0219174 A1 | 9/2008 | Ribeiro | |
| 2009/0232005 A1 | 9/2009 | Mohan et al. | |
| 2010/0020722 A1 | 1/2010 | Farkas et al. | |
| 2010/0272110 A1 | 10/2010 | Allan et al. | |
| 2011/0007670 A1 | 1/2011 | Yan | |

FOREIGN PATENT DOCUMENTS

| | | |
|---|---|---|
| CN | 101448003 A | 6/2009 |
| CN | 101483570 A | 7/2009 |
| CN | 102291289 A | 12/2011 |
| JP | 2012-109864 A | 6/2012 |
| WO | 2012/081146 A1 | 6/2012 |
| WO | 2012/081631 A1 | 6/2012 |
| WO | 2012/093429 A1 | 7/2012 |

OTHER PUBLICATIONS

Extended European Search Report, EP Application No. 12885196.1, Date: Apr. 25, 2016, pp. 1-10.
Farhad Faghani et al., "Enhanced Forwarding Strategy in Metro Ethernet Networks," ICACT2012, Feb. 19, 2012, pp. 716-720, IEEE.
GRG, "Basic Spanning Tree," From OpenFlow Wiki, Nov. 23, 2010, pp. 1-6, MediaWiki and WordPress.
International Search Report and Written Opinion, International Application No. PCT/US2012/057569, Date: Apr. 30, 2013, pp. 1-9.
Kleef, A.Vet al. "Report: Self Adaptive Routing", Aug. 13, 2010.
Office Action, EP Application No. 12885196.1, Date: Dec. 12, 2016, pp. 1-6, EPO.
Office Action, JP Application No. 2015-533033, Date: Jan. 28, 2016, pp. 1-5.
The State Intellectual Property Office of People's Republic of China, "The Second Office Action of Chinese Application No. 201280076093.5" wilh machine English translation, dated Dec. 11, 2017, 20 pages.
Cisco Press, "Cisco IP Telephony Flash Cards: Weighted Random Early Detection (WRED)," Nov. 24, 2004, Cisco IP Telephony Flash Cards and Exam Practice Pack, < https://www.ciscopress.com/articles/article.asp?p=352991&seqNum=6>, 8 pages.
Cisco Systems, Inc., "Understanding Spanning-Tree Protocol," Oct. 12, 2008, Cisco Documentation, 12 pages.
Hewlett-Packard Development Company, L.P., "Multiple Instance Spanning-Tree Operation," Jul. 2006, Advanced Traffic Management Guide, ProCurve Series 2810 Switches N.10.XX, Chapter 5, pp. 5-1-5-40.
Hojat et al., "Formal Verification of the IEEE 802.1D Spanning Tree Protocol Using Extended Rebeca," 2006, Electronic Notes in Theoretical Computer Science, vol. 159, pp. 139-154.
Nichols et al., "Definition of the Differentiated Services Field (DS Field) in the IPV4 and IPV6 Headers," Dec. 1998, Network Working Group, Request for Comments: 2474, <https://datatracker.ietf.org/doc/html/rfc2474>, 20 pages.
Open Networking Foundation, "OpenFlow Switch Specification," Dec. 31, 2009, Version 1.0.0 (Wire Protocol 0x01), < https://opennetworking.org/wp-content/uploads/2013/04/openflow-spec-v1.0.0.pdf>, 44 pages.
Petr Lapukhov, "Understanding Multiple Spanning Tree Protocol," Feb. 22, 2010, <https://ine.com/blog/2010-02-22-understanding-mstp>, 41 pages.

* cited by examiner

TRANSMIT SPECIFIC TRAFFIC ALONG BLOCKED LINK

BACKGROUND

Networks generally employ a Spanning Tree Protocol (STP) in order to prevent traffic loops from being formed between switches in the network. The STP blocks redundant links between switches to prevent the loops. Network administrators are challenged to find ways to improve throughput, reliability and/or security of traffic traversing the network.

BRIEF DESCRIPTION OF THE DRAWINGS

The following detailed description references the drawings, wherein.

DETAILED DESCRIPTION

Layer 2 switching in a network generally relies on features such as a Spanning Tree Protocol (STP) (802.1d) in order to prevent traffic loops from being formed in the network. To prevent loops, redundant links may be blocked and thus not used by the STP. Further, the STP is a switch-to-switch protocol where all devices are peers and a global view of the entire network is unknown.

This "blocking" of redundant links may be a waste of networking equipment since ports and cables cost money and are sitting idle. While the STP does provide the benefit of being able to activate these links if a link failure occurs elsewhere, these links are usually unused. The multiple instance spanning tree protocol (MSTP) (IEEE 802.1s) provides a method of overlapping spanning trees on top of one another using Virtual Local Area Networks (VLAN). For example, a customer may configure two VLANs, each with its own MSTP instance, and each MSTP instance blocking a different port. The MSTP allows more links to remain active, but many will still be unused on certain VLANs (MSTP instances).

Administrators may use features such as QoS or DiffServ in order to classify or prioritize specific traffic higher in order, to increase the likelihood that the specific traffic won't be dropped or delayed. This may raise the allocation of network bandwidth for certain types of traffic, such as the specific traffic, but the blocked links will still remain unused.

Rather than send the specific traffic over potentially congested normal links with the hope that QoS/DiffServ will classify this traffic higher, embodiments may take advantage of the blocked links. For example, using the global view of an STP network and a different type of protocol, such as OpenFlow, embodiments may forward the specific traffic through the unused, blocked links. For example, the OpenFlow protocol may allow a customer/controller to setup the paths that traffic shall take based on contents within the traffic flow. The OpenFlow protocol also provides a flexible classification mechanism for identifying traffic, such as by commanding devices to forward traffic based on rules.

In an embodiment, a status of the links is one of blocked and non-blocked. A blocked link is not used by a Spanning Tree Protocol (STP). At least one of the network switches is configured to transmit the specific traffic along the blocked link. In some embodiments, parameters may also be modified to manipulate which links become blocked. A benefit of using the blocked links is that the specific traffic does not have to contend with other types of traffic, since the other types of traffic will be traversing the non-blocked STP links. Further, embodiments may be used to supplement and coexist with existing STP or MSTP networks, instead of causing administrators to implement an entirely new type of network.

Figure 1:
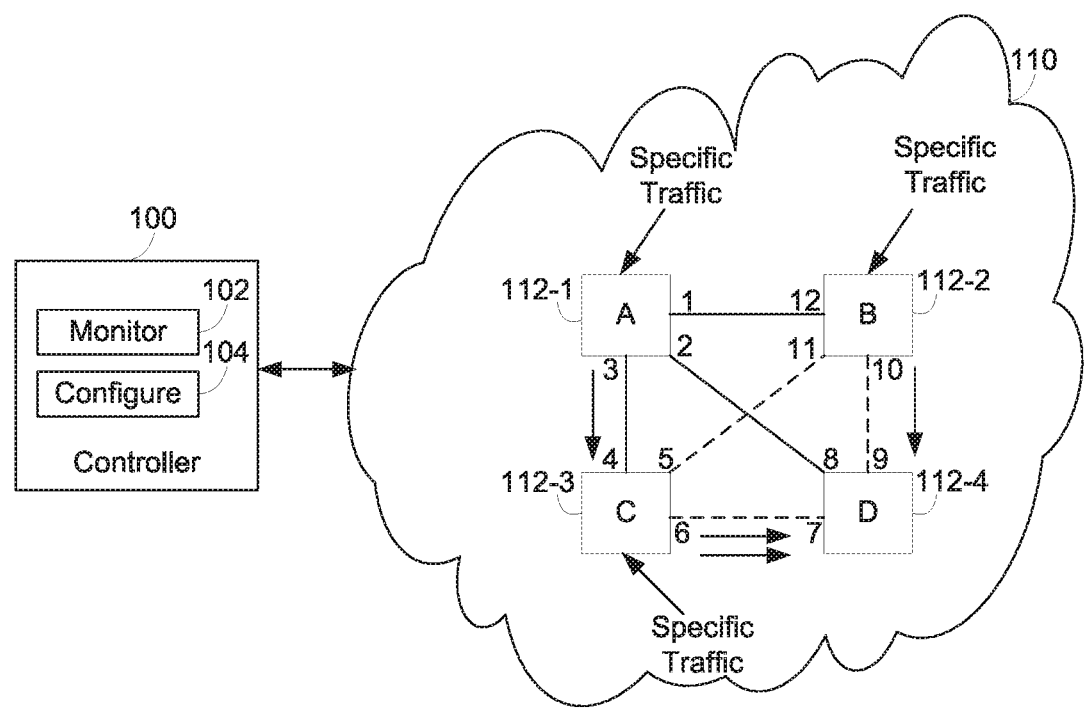
FIG. 1 is an example block diagram of a controller for transmitting specific traffic along a blocked link.

Referring now to the drawings, FIG. 1 is an example block diagram of a controller 100 for transmitting specific traffic along a blocked link. The controller 100 may be a separate element or included in a switch, hub, router, gateway, storage device, computer, enclosure, server, and/or any type of device capable of managing network elements and/or connecting to a network.

In the embodiment of FIG. 1, the controller 100 connects to a network 110 including a plurality of network switches 112-1 to 112-4. Examples of a type of the network 110 may include a personal area network (PAN), a local area network (LAN), a home network, a storage area network (SAN), a campus network, a backbone network, a Metropolitan area network (MAN), a wide area network (WAN), an enterprise private network, a virtual private network (VPN), an Internetwork, and the like.

While the network 110 shows four switches 112-1 to 112-4, embodiments may include more or less than four switches. The switches 112-1 to 112-4 may be any type of device that connects links and/or network devices. Further, the switches 112-1 to 112-4 may receive and forward data via physical ports that interface with the links. The links may be any type of electrical connection between the switches used for transmitting the data, such as cables.

The controller 100 and switches 112-1 to 112-4 may include, for example, a hardware device including electronic circuitry for implementing the functionality described below, such as control logic and/or memory. In addition or as an alternative, the controller 100 and switches 112-1 to 112-4 may be implemented as a series of instructions encoded on a machine-readable storage medium and executable by a processor.

In FIG. 1, the switches 112-1 to 112-4 are each shown to have three ports, with each of the ports interfacing with a link. For example, the A switch 112-1 is shown to have a first port 1 connecting via a link to a twelfth port 12 of the B switch 112-2, a second port 2 connecting via a link to an eighth port 8 of the D switch 112-4, and a third port 3 connecting via a link to a fourth port 4 of the C switch 112-3. Further, the B switch 112-2 is shown to have a tenth port 10 connecting via a link to a ninth port 9 of the D switch 112-4 and an eleventh port 11 connecting via a link to a fifth port 5 of the C switch 112-3. Also, the C switch 112-3 is shown to have a sixth port 6 connecting via a link to a seventh port 7 of the D switch 112-4. However, embodiments of each of the switches 112-1 to 112-4 may include more or less than three ports as well as ports that are not interfacing with a link.

Moreover, some of the links between the switches 112-1 to 112-4 are shown as solid lines while other links are shown as dotted lines. For example, dotted lines are shown for the link between the C and B switches 112-3 and 112-2, the link between the C and D switches 112-3 and 112-4 and the link between the B and D switches 112-2 and 112-4. On the other hand solid lines are shown for the link between the A and B switches 112-1 and 112-2, the link between the A and C switches 112-1 and 112-3 and the link between the A and D switches 112-1 and 112-4.

The dotted lines represent blocked links while the solid lines represent non-blocked links. A network protocol may configure one or more ports of the switches 112-1 to 112-4 to block both incoming and outgoing traffic, in order to form the blocked links. For example, the STP may form such blocked links to ensure a loop-free topology for the network 110. In FIG. 1, the STP may have blocked some of links so as to form a spanning tree with the A switch 112-1 as a root of the spanning tree. Variations of the STP may include a Rapid Spanning Tree Protocol (RSTP), a VLAN Spanning Tree Protocol (VSTP), a Multiple Spanning Tree Protocol (MSTP) and the like.

The controller 100 is to monitor 102 a logical topology of a network 110, such as to have a global view of an STP network. The logical topology may include at least one of a physical and active topology of the network 110. The physical topology of the network 110 may be defined by a physical design, such as layout of the links and the locations of switches. The active topology may refer to how data is transferred in the network 110 from one device to the next, and may be determined by network protocols, such as the STP.

Thus, the physical topology may relate to distances between the switches 112-1 to 112-4, physical interconnections, transmission rates, and/or signal types while the active topology may relate to the paths or links of the physical topology on which the packets of traffic are allowed to travel. Hence, by monitoring the logical topology 102, the controller 100 may identify any links being blocked, such as by the STP. For example, the controller 100 may actively monitor all devices, such as the switches 112-1 to 112-4, within the network 110 and take note of the STP state, such as which ports of the switches 112-1 to 112-4 are blocked.

Next, the controller 100 may configure at least one of the network switches 112-1 to 112-4 to transmit specific traffic along a blocked link. The specific traffic may be different than general traffic, which cannot traverse a blocked link.

The specific traffic may relate to data having, for example, latency, packet-loss and/or security requirements different than that of the general traffic. The specific traffic may be identified or based on, for example, a type of user, priority, source and/or content of the data included in the specific traffic. Examples of the specific traffic that may have latency requirements include multi-cast streams, video traffic, VoIP data and the like. Such types of specific traffic may be identified based on content type, such as by inspecting a header of the specific traffic. Examples of the specific traffic that may have security requirements may include financial, corporate or personal data. In one embodiment, such types of specific traffic may be identified based on type of user. For instance, emails of an executive of a company may have higher security than that of staff of the company.

Examples of the specific traffic that may have priority requirements may include back-up data and financial services transactions. For instance, the back-up data may have a lower priority than the general traffic and transmitted during off-peak hours or on the blocked links in order not to consume bandwidth that could be used for the general traffic. On the other hand, financial service transactions, such as stock or trader transactions, may have a high priority. Such types of specific traffic may be identified based on, for example, a source of the data.

The controller 100 is to configure a blocked port (not shown) of at least one the network switches 112-1 to 112-4 associated with the blocked link, to allow the specific traffic to traverse the blocked link. Further, the controller 100 is to define a path along the links to forward the specific traffic. The path may include at least one blocked link. However, the controller 100 may also define the path to include one or more non-blocked links, such as when all of the links connecting to one of the network switches 112-1 to 112-4 along the path are non-blocked links. The non-blocked link may also be used by the general traffic.

For example, in FIG. 1, the specific traffic is shown to enter via the A, B and C switches 112-1 to 112-3 and is to be directed toward the D switch 112-4. Normally, any traffic, including the specific traffic, that entered via the B and C switches, would be transmitted to the A switch 112-1 via the non-blocked links. From the A switch 112-1 the specific traffic would then be directed to the destined D switched 112-4 via another non-blocked link. However, as shown in FIG. 1, the controller 100 may configure the specific traffic entering the A switch to be transmitted to the C switch 112-3. Here, the specific traffic from the A switch 112-1 may join any other specific traffic entering the C switch 112-3 and be transmitted directly to the D switch 112-4 via the blocked link between sixth and seventh ports 6 and 7 of the C and D switches 112-3 and 112-4.

Similarly, the controller 100 may direct any specific traffic entering the B switch 112-2 to be transmitted directly to the D switch 112-4 via the blocked link between the tenth and ninth ports 10 and 9 of the B and D switches 112-2 and 112-4. Thus, not only is congestion eased on the non-blocked links by using the blocked links to transmit the specific traffic, but the specific traffic may also be transmitted more quickly by hopping through less switches 112.

The controller 100 may configure any of the switches 112-1 to 112-4 to direct the specific type of traffic along the blocked links via the OpenFlow protocol. The OpenFlow is a Layer 2 communications protocol that gives access to a forwarding plane (not shown) of the switch 112 over the network 110. Further, the OpenFlow protocol may allow the path of the specific traffic through the switches 112-1 to 112-4 to be dynamically determined by software or firmware running at a centralized location and/or in a distributed manner, such as at multiple switches 112.

In one embodiment, the controller 100 may define primary and secondary paths along the links to forward the specific traffic. In this case, if one of the links of the first path fails, the controller 100 may configure the one or more the network switches 112-1 to 112-4 to forward the specific traffic along the secondary path, so as to navigate around the failed link(s).

Example protocols the controller 100 may use to communicate with the switches 112-1 to 112-3 may include the Link Layer Discovery Protocol (LLDP), Simple Network Management Protocol (SNMP), Dynamic Host Configuration Protocol (DHCP), Simple Service Discovery Protocol (SSDP), Universal Plug and Play (UPnP) and the like. The controller 100 may configure the switches 112 automatically or according to manual input. Further, the switches 112-1 to 112-4 may operate according to both the Openflow and STP protocols. For example, the switches 112-1 to 112-4 may operate according to the Openflow protocol for the specific traffic and according to the STP protocol for the general traffic and/or if a link fails.

Figure 2:
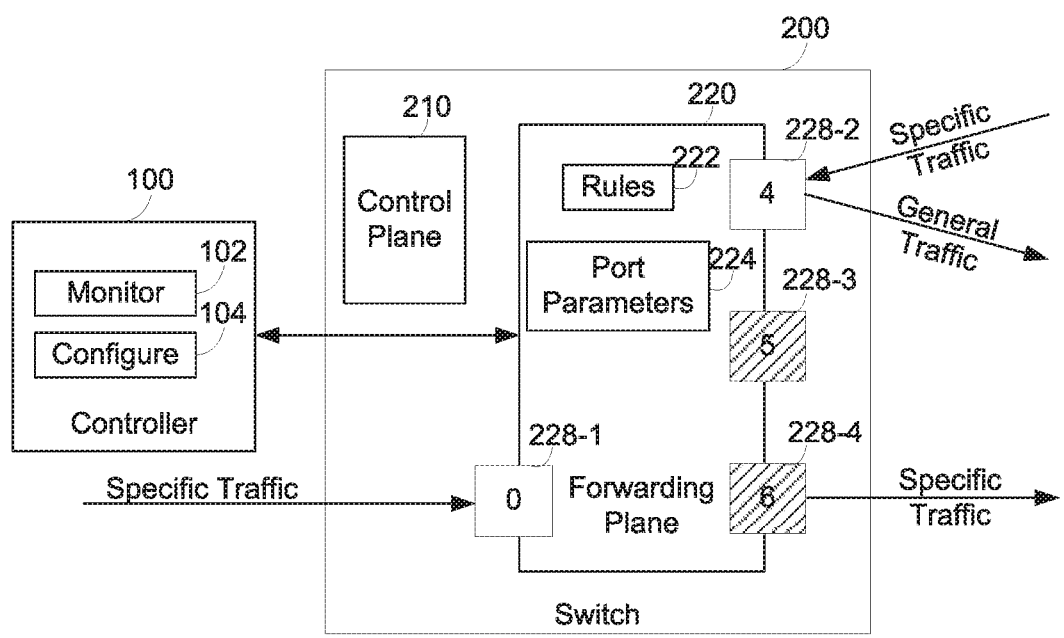
FIG. 2 is another example block diagram of a switch interfacing with the controller of FIG. 1.

FIG. 2 is another example block diagram of a switch 200 interfacing with the controller 100 of FIG. 1. The controller 100 may be a separate element or included in a switch, hub, router, gateway, storage device, computer, enclosure, server, and/or any type of device capable of managing network elements and/or connecting to a network.

The controller 100 and the switch 200 of FIG. 2 may at least respectively include the functionality and/or hardware of the controller 100 and the switches 112-1 to 112-4 of FIG. 1. For example, while the switch 200 is shown to be representative of the C switch 112-3 of FIG. 1, the other switches 112-1, 112-2 and 112-4 may also be similar.

In the embodiment of FIG. 2, the switch 200 is shown to include a control plane 210 and a forwarding plane 220. The forwarding plane 220 is shown to further include rules 222 and port parameters 224 as well as interface with switch ports 228-1 to 228-4. The first switch port 228-1 may correspond to a port (not shown) of the C switch 112-3 that receives the specific traffic. The second through fourth switch ports 228-2 to 228-4 may correspond to the fourth through sixth ports 4 to 6 of the C Switch 112-3. The control plane 210 may be a part of a switch architecture related to drawing a network map and/or a routing table that defines what to do with incoming packets of traffic. The forwarding plane 220 may be a part of the switch architecture related to deciding what to do with the incoming packets arriving on an inbound interface, such as a look-up table indicating the destination address and/or outgoing interface of the incoming packet.

As explained above in FIG. 1 and shown in FIG. 2 by a diagonal pattern, the third and fourth switch ports 228-3 and 228-4 are blocked. The first and second switch ports 228-1 and 228-2 are not blocked. In this case, both the first and second switch ports 228-1 and 228-2 are shown to receive the specific traffic while the second switch port 228-2 is also to shown output the general traffic. As shown in FIG. 1, an example path for the specific traffic may be defined by the controller 100 to flow from the third port 3 of the A switch 112-1 to the fourth port 4 (the second switch port 228-2 of switch 200) of the C switch 112-3. Further, the specific traffic received from the first switch port 228-1 and the second switch port 228-2 may be output to the blocked fourth switch port 228-4, in order to transmit the specific traffic to the D switch 112-4 via the blocked link.

The switch 200 is able to direct the specific traffic to one or more of the blocked links, based on a Software Defined Networking (SDN) architecture that separates the control plane 210 from the forwarding plane 220 of the switch 200, such as the OpenFlow protocol. For example, via OpenFlow, the controller 100 may access the forwarding plane 220 to setup one or more rules 222 that directs the specific traffic along a blocked port, such as the blocked fourth switch port 228-4. The rules 222 may be defined as any type of instruction delivered by the controller 100 indicating which port(s) the specific traffic is be output.

In FIG. 2 the controller 100 is shown to be separate from the switch 200. However, embodiments may include the controller 100 being included in one of the switches 112 or 200 and/or being a higher layer device separate from the switches 112-1 to 112-4 or 200. For example, if the controller 100 is the higher layer device, in addition to or instead of setting the rules 222, the controller 100 may be able to configure one or more port parameters 224 of one of the network devices along the path, such as the switch 200. Each of the ports, such as the second through fourth switch ports 228-2 to 228-4, may have one or more corresponding port parameters 224. The configured port parameter(s) 224 may cause a corresponding port and link to appear less desirable to the STP. As a result, the configured parameter(s) 224 may cause the STP to change a status of the corresponding link from non-blocked to blocked. For example, the STP may look to certain port parameters 224, such as port priority and path cost, of a port to determine a desirability of a corresponding link. The controller 100 may influence the port parameters 224 either directly or indirectly, such as by altering values of the switch 200, like a port location, a port speed and a hop count.

The term port priority may refer to a preference that the STP gives a port relative to other ports for forwarding traffic. For example, this parameter can be used to assign a higher (or lower) priority to the port, where a higher numerical value means a lower priority higher. In the event that traffic is re-routed, ports are re-routed based on their priority such that preference is given to higher priority ports over lower priority ports within a VLAN or on the switch 200. The term path cost may refer to the cost of using a port to reach the root bridge or switch. When selecting among multiple links to the root bridge, the STP chooses the link with the lowest path cost and blocks the other paths/links. For example, this parameter can be used to assign a higher or lower path cost to a port. Assigning a higher value to a certain port may bias traffic away and vice versa, during periods of rerouting.

In FIG. 1, the controller 100 may automatically or manually configure at least one of the port parameters 224. For manual configuration, the controller 100 may be associated with a keyboard, mouse, display, Graphical user interface (GUI), touchscreen, and the like, in order allow an administrator to enter a different value for a port parameter. After one or more port parameters are changed, the STP may re-calculate the path. In some cases, a link that was previously non-blocked may become blocked and vice versa. Further, the manual configuration may also be used by the administrator to create new rules, upon seeing the STP topology.

If the network 110 includes VLANs, the MSTP may be used to manage the plurality of VLANS, with the MSTP to block different links for different VLANs. Thus, the use of MSTP results in only partial blocking of a link. For example, with MSTP, links may be blocked on some MSTP instances, but not all. From a usage standpoint, this allows all links to be active, but only on some instances. An MSTP instance is defined by a set of VLANs.

In this case, the controller 100 may create rules 222 to direct the specific traffic along the one or more of ports of the network switches 112-1 to 112-4 based on which of the VLANs is active at a given time, and thus which of the links is blocked at a given time. Alternatively or in addition, the controller 100 may configure an instance of the port parameters 224 to influence which of the links become blocked.

Figure 3A:
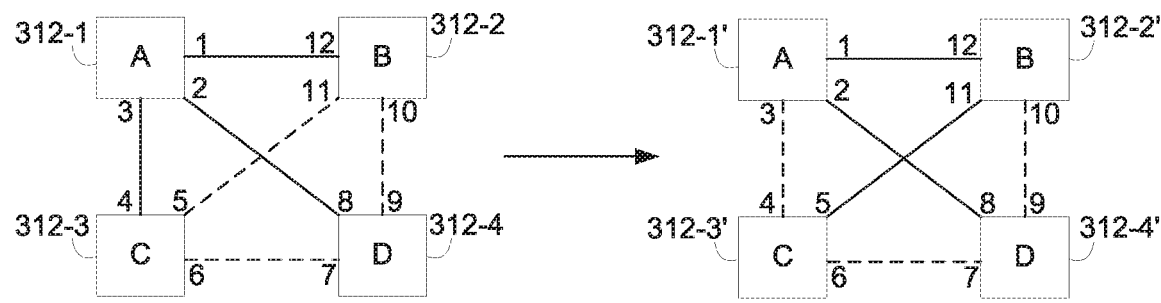
FIG. 3A is an example block diagram of network links being configured by the controller of FIG. 1
Figure 3B:
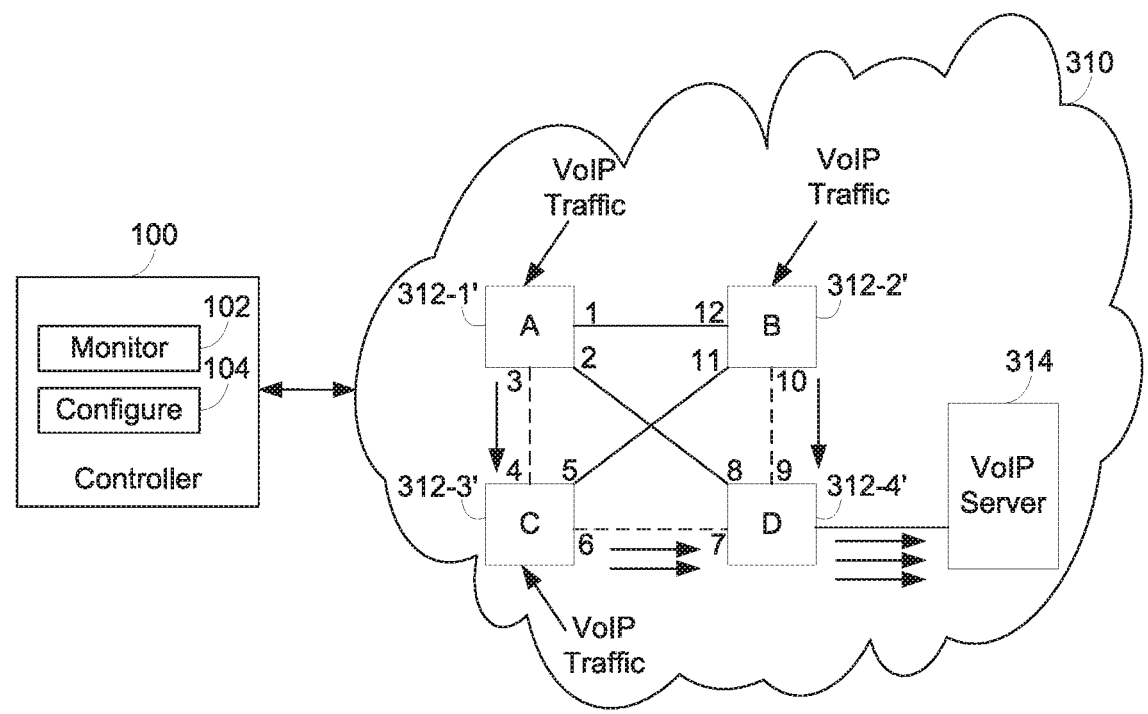
FIG. 3B is an example block diagram of traffic flow along the configured network links of FIG. 3A.

FIG. 3A is an example block diagram of network links being configured by the controller 100 of FIG. 1 and FIG. 3B is an example block diagram of traffic flow along the configured network links of FIG. 3A. The switches 312-1 to 312-4 shown in FIGS. 3A and 3B may be similar to the switches 112-1 to 112-4 of FIG. 1. For example, the switches 312-1 to 312-4 and ports thereof in FIGS. 3A and 3B may be labeled similar to that of FIG. 1. Initially, the switches 312-1 to 312-4 of FIG. 3A are shown to have a similar configuration to the switches of 112-1 to 112-4 of FIG. 1, with there being blocked links between the C and B switches 312-3 and 312-2, the C and D switches 312-3 and 312-4 and the B and D switches 312-2 and 312-4.

However, as explained above with respect to FIG. 2, the controller 100 may be able to configure port parameters such that the STP will then reconfigure an unblocked link to a blocked link or a blocked link to an unblocked link. This may be desirable in order to create a path for the specific traffic in which the general traffic is reduced or removed. For example, if the controller 100 is not able to find any blocked links to a desired endpoint for the specific traffic, the controller 100 convert at least one of the unblocked links into a blocked link. In FIG. 3A, the controller 100 is shown to configure port parameters so that the unblocked link between the A and C switches 312-1' and 312-3' is converted into a blocked link and the blocked link between the C and B switches 312-3' and 312-2' is converted into an unblocked link.

FIG. 3B shows a controller 100 and a network 310 including the switches 312-1' to 312-4' with the configured port parameters of FIG. 3A. The controller 100 and the network 310 of FIG. 3B may respectively include at least the functionality and/or hardware of the controller 100 and the network 310 of FIG. 1. In this case, the specific traffic is shown to be voice over Internet Protocol (VoIP) traffic, which is to be transmitted towards the D switch 312-4 in order to passed on to a VoIP server 314. Similar to FIG. 1, the VoIP traffic is received via the A, B and C switches 312-1' to 312-3'. However, unlike FIG. 1, all of the VoIP traffic may now flow over only blocked links due to the controller 100 configuring port parameters so that the previously unblocked link between the A and C switches 312-1' and 312-3' is now a blocked link. Hence, as the controller 100 has provided a dedicated path of blocked links for the VoIP traffic, timing delays due to congestion for the VoIP traffic may be reduced or minimized. Though as a result, a path for the general traffic to the C switch 312-3' may be longer as the C switch 312-3' is now two hops away from A switch 312-1'.

Figure 4:
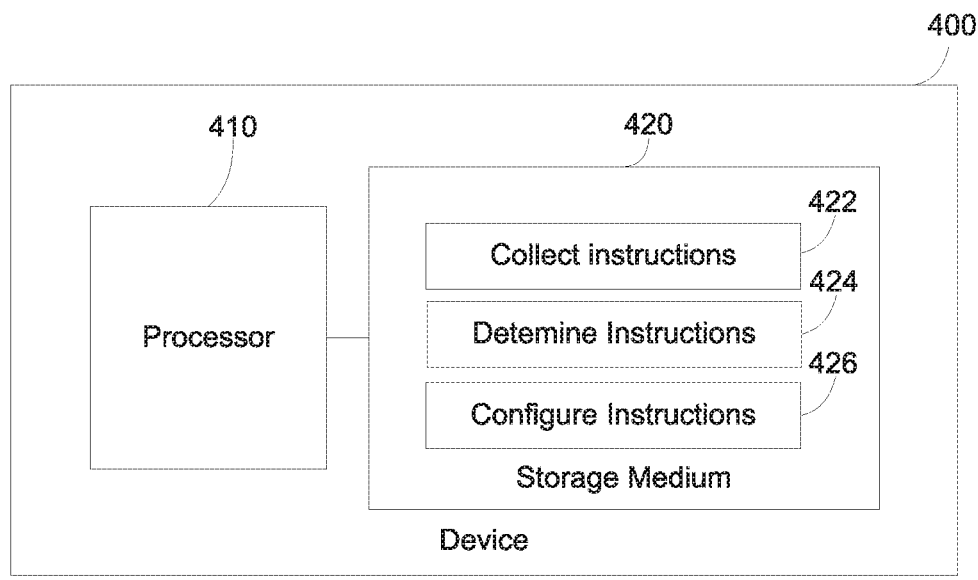
FIG. 4 is an example block diagram of a computing device including instructions for transmitting specific traffic along a blocked link.

FIG. 4 is an example block diagram of a computing device 400 including instructions for transmitting specific traffic along a blocked link. In the embodiment of FIG. 4, the computing device 400 includes a processor 410 and a machine-readable storage medium 420. The machine-readable storage medium 420 further includes instructions 422, 424 and 426 for transmitting specific traffic along the blocked link.

The computing device 400 may be or part of, for example, a server, a network switch, a hub, a router, a gateway, a network element, or any other type of device capable of executing the instructions 422, 424 and 426. In certain examples, the computing device 400 may include or be connected to additional components such as memories, sensors, displays, etc.

The processor 410 may be, at least one central processing unit (CPU), at least one semiconductor-based microprocessor, at least one graphics processing unit (GPU), other hardware devices suitable for retrieval and execution of instructions stored in the machine-readable storage medium 420, or combinations thereof. The processor 410 may fetch, decode, and execute instructions 422, 424 and 426 for transmitting specific traffic along the blocked link. As an alternative or in addition to retrieving and executing instructions, the processor 410 may include at least one integrated circuit (IC), other control logic, other electronic circuits, or combinations thereof that include a number of electronic components for performing the functionality of instructions 422, 424 and 426.

The machine-readable storage medium 420 may be any electronic, magnetic, optical, or other physical storage device that contains or stores executable instructions. Thus, the machine-readable storage medium 420 may be, for example, Random Access Memory (RAM), an Electrically Erasable Programmable Read-Only Memory (EEPROM), a storage drive, a Compact Disc Read Only Memory (CD-ROM), and the like. As such, the machine-readable storage medium 420 can be non-transitory. As described in detail below, machine-readable storage medium 420 may be encoded with a series of executable instructions for transmitting specific traffic along the blocked link.

Figure 5:
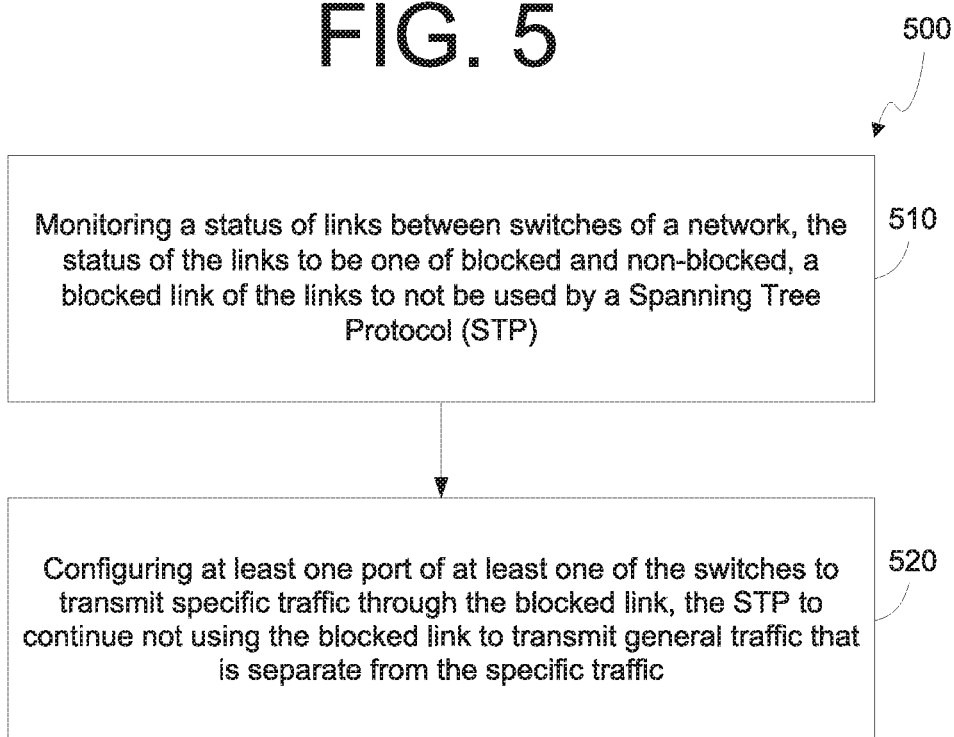
FIG. 5 is an example flowchart of a method for transmitting specific traffic along a blocked link.

Moreover, the instructions 422, 424 and 426 when executed by a processor (e.g., via one processing element or multiple processing elements of the processor) can cause the processor to perform processes, such as, the process of FIG. 5. For example, the collect instructions 422 may be executed by the processor 410 to collect topological information about links between switches (not shown) of a network (not shown). The determine instructions 424 may be executed by the processor 410 to determine which of the links is blocked by the STP. The configure instructions 426 may be executed by the processor 410 to configure at least one of the switches via the OpenFlow protocol to allow specific traffic to be transmitted along at least one of the blocked links. However, the switches are to operate according to commands from both the STP and Openflow protocols.

FIG. 5 is an example flowchart of a method 500 for transmitting specific traffic along a blocked link. Although execution of the method 500 is described below with reference to the controller 100, other suitable components for execution of the method 500 can be utilized. Additionally, the components for executing the method 500 may be spread among multiple system and/or devices (e.g., a processing device in communication with input and output devices). In certain scenarios, multiple devices acting in coordination can be considered a single device to perform the method 500. The method 500 may be implemented in the form of executable instructions stored on a machine-readable storage medium, such as storage medium 420, and/or in the form of electronic circuitry.

At block 510, the controller 100 monitors a status of links between switches 112 of a network 110. The status of the links is one of blocked and non-blocked. A blocked link of the links 112 is not used by the STP. Next, at block 520, the controller 100 configures at least one port of at least one of the switches 112 to transmit specific traffic along the blocked link. The STP will continue not to use the blocked link to transmit general traffic that is separate from the specific traffic. The controller 100 is to configure the switches 112 at a layer-2 level. Further, the controller 110 is to monitor the status of the links 112 at block 510 before configuring at least one of the ports 228, at block 520. The controller 100 may communicates with the switches 112 to configure one or more ports 228 via, for example, a Simple Network Management Protocol (SNMP).

Specific details are given in the above description to provide an understanding of embodiments. However, it will be understood that embodiments may be practiced without these specific details. For example, systems may be shown in block diagrams in order not to obscure embodiments in unnecessary detail. In other instances, well-known processes, structures and techniques may be shown without unnecessary detail in order to avoid obscuring embodiments.

We claim:
1. A controller of a network, comprising:
a processor; and
a non-transitory machine-readable storage medium comprising instructions that, when executed on the processor, cause the controller to:

identify a blocked link in the network, the blocked link including a first blocked port of a first switch and a second blocked port of a second switch;

configure the network to classify data traffic of the network as first traffic of a first class and second traffic of a second class based on a security requirement of the data traffic, wherein the first traffic of the first class comprises specific traffic exhibiting a security requirement that differs from a security requirement of the second traffic of the second class; and configure the network, including the first switch and the second switch, to forward the first traffic of the first class along a first path and to forward the second traffic of the second class along a second path, wherein the first path includes the blocked link and the second path does not include the blocked link.

2. The controller of claim 1, wherein the blocked link prevents a network loop.

3. The controller of claim 2, wherein the blocked link is blocked based on a spanning tree protocol (STP) command.

4. The controller of claim 1, wherein the controller maintains a logical topology of the network, the logical topology including an active topology determined according to a network protocol, and a physical topology determined by a physical layout.

5. The controller of claim 4, wherein the instructions when executed on the processor cause the controller to determine, based on the physical topology and the active topology, that the blocked link is blocked.

6. The controller of claim 1, wherein the blocked link is blocked for a first virtual local area network (VLAN), and the blocked link is not blocked for a second VLAN.

7. The controller of claim 6, wherein the first traffic classified in the first class is associated with the second VLAN.

8. The controller of claim 1, wherein the security requirement of the first traffic of the first class is higher than the security requirement of the second traffic of the second class.

9. A method comprising:
transmitting, from a switch of a network to a controller of the network, an indication that a first port of the switch is blocked, wherein the first port is blocked based on being associated with a blocked link;

receiving, at the switch, a command from the controller to forward traffic of a first class along a first path and to forward traffic of a second class along a second path, wherein the first path includes the blocked link and the second path does not include the blocked link;

receiving, at the switch, a command from the controller to classify data traffic of the network as being according to the first class or the second class;

receiving, at the switch, a first portion of the data traffic comprising back-up data;

classifying the first portion of the data traffic as first traffic of the first class based on the first portion of the data traffic comprising the back-up data;

routing the first traffic of the first class along the first path including the blocked link;

receiving, at the switch, a second portion of the data traffic;

classifying the second portion of the data traffic as second traffic of the second class based on the second portion of the data traffic comprising data different from the back-up data; and routing the second traffic of the second class along the second path not including the blocked link.

10. The method of claim 9, wherein the blocked link is blocked for a first virtual local area network (VLAN) and the blocked link is not blocked for a second VLAN.

11. The method of claim 10, wherein the first traffic of the first class is associated with the second VLAN.

12. The method of claim 9, wherein the network is a software defined wide area network (SD-WAN), and the controller is a SD-WAN controller.

13. A non-transitory machine-readable storage medium comprising instructions that when executed cause a controller to:

identify a blocked link in a network, the blocked link including a first blocked port of a first switch and a second blocked port of a second switch;

configure the network to classify data traffic of the network as first traffic of a first class and second traffic of a second class based on a security requirement of the data traffic, wherein the first traffic of the first class comprises specific traffic exhibiting a security requirement that differs from a security requirement of the second traffic of the second class; and configure the network, including the first switch and the second switch, to forward the first traffic of the first class along a first path and to forward the second traffic of the second class along a second path, wherein the first path includes the blocked link and the second path does not include the blocked link.

14. The non-transitory machine-readable storage medium of claim 13, wherein the blocked link is blocked for a first virtual local area network (VLAN), and the blocked link is not blocked for a second VLAN.

15. The non-transitory machine-readable storage medium of claim 14, wherein the first traffic of the first class is associated with the second VLAN.

16. The non-transitory machine-readable storage medium of claim 13, wherein the security requirement of the first traffic of the first class is higher than the security requirement of the second traffic of the second class.

17. The non-transitory machine-readable storage medium of claim 13, wherein the blocked link prevents a network loop.

18. The non-transitory machine-readable storage medium of claim 13, wherein the blocked link is blocked based on a spanning tree protocol (STP) command.

19. The non-transitory machine-readable storage medium of 13, wherein the controller maintains a logical topology of the network, the logical topology including an active topology determined according a network protocol and a physical topology determined by a physical layout, and wherein the instructions when executed cause the controller to:

determine, based on the physical topology and the active topology, that the blocked link is blocked.

* * * * *